United States Patent
Guo et al.

(10) Patent No.: US 12,228,232 B2
(45) Date of Patent: Feb. 18, 2025

(54) MULTI-MANIFOLD CONNECTOR

(71) Applicant: GTC Gas Technology Co., Ltd., Zhuhai (CN)

(72) Inventors: Jianheng Guo, Zhuhai (CN); Yong Wang, Zhuhai (CN)

(73) Assignee: GTC Gas Technology Co., Ltd., Zhuhai (CN)

(*) Notice: Subject to any disclaimer, the term of this patent is extended or adjusted under 35 U.S.C. 154(b) by 0 days.

(21) Appl. No.: 18/286,769

(22) PCT Filed: Apr. 14, 2022

(86) PCT No.: PCT/CN2022/086831
§ 371 (c)(1),
(2) Date: Oct. 13, 2023

(87) PCT Pub. No.: WO2022/218378
PCT Pub. Date: Oct. 20, 2022

(65) Prior Publication Data
US 2024/0191821 A1 Jun. 13, 2024

(30) Foreign Application Priority Data
Apr. 13, 2021 (CN) .......................... 202120745449.6

(51) Int. Cl.
F16L 41/03 (2006.01)
(52) U.S. Cl.
CPC .................................. F16L 41/03 (2013.01)
(58) Field of Classification Search
CPC ...................................................... F16L 41/03
USPC .......................................................... 285/130.1
See application file for complete search history.

(56) References Cited

U.S. PATENT DOCUMENTS

| 4,498,693 A * | 2/1985 | Schindele | F16L 41/03 |
| | | | 248/223.41 |
| 5,050,631 A * | 9/1991 | Konno | F16L 41/03 |
| | | | 137/271 |
| 11,226,642 B2 * | 1/2022 | Cook | B62D 21/20 |
| 11,359,474 B1 * | 6/2022 | Uhlmer | F16L 41/03 |
| 2017/0268710 A1 * | 9/2017 | Martensson | B67D 7/0478 |
| 2018/0030697 A1 | 2/2018 | Lin | |
| 2018/0290362 A1 * | 10/2018 | Skavicus | F16K 31/602 |

(Continued)

FOREIGN PATENT DOCUMENTS

| CN | 2627420 Y | 7/2004 |
| CN | 101957051 A | 1/2011 |
| CN | 203477724 U | 3/2014 |

(Continued)

Primary Examiner — David Bochna
(74) Attorney, Agent, or Firm — Bayramoglu Law Offices LLC

(57) ABSTRACT

A multi-manifold connector is provided. The multi-manifold connector includes a base, a hot water connector, and a cold water connector, where the hot water connector and the cold water connector are arranged on the base; the hot water connector is provided with a water inlet; the cold water connector is provided with a water outlet; a bottom of the base is provided with multiple first water pipes and multiple second water pipes; the multiple first water pipes run through the base and are communicated with the hot water connector; and the multiple second water pipes run through the base and are communicated with the cold water connector.

7 Claims, 1 Drawing Sheet

(56) References Cited

U.S. PATENT DOCUMENTS

2022/0042288 A1\* 2/2022 Braathen ................. F16L 41/03
2023/0119473 A1\* 4/2023 Roesner ................. F16L 41/03
                                                              137/597

FOREIGN PATENT DOCUMENTS

| CN | 109268606 A | | 1/2019 | | |
|----|---|---|---|---|---|
| CN | 215410752 U | | 1/2022 | | |
| GB | 2239068 A | \* | 6/1991 | ............. | F16L 39/00 |
| WO | WO-2016204628 A1 | \* | 12/2016 | ............... | E03B 7/04 |

\* cited by examiner

MULTI-MANIFOLD CONNECTOR

CROSS REFERENCE TO THE RELATED APPLICATIONS

This application is the national phase entry of International Application No. PCT/CN2022/086831, filed on Apr. 14, 2022, which is based upon and claims priority to Chinese Patent Application No. 202120745449.6, filed on Apr. 13, 2021, the entire contents of which are incorporated herein by reference.

TECHNICAL FIELD

The present disclosure relates to the technical field of water distribution pipe connectors and in particular to a multi-manifold connector.

BACKGROUND

An indoor radiator for heat pump heating usually includes fan coils. Usually, when the coils converge to the main pipe, the water inlet pipes are welded together with a water inlet joint, and the water outlet pipes are welded together with a water outlet joint. The preparation and welding process of the pipe joints is complex, and features hard-to-guarantee quality, long welding time, and low production capacity.

SUMMARY

A technical problem to be solved by the present disclosure is to overcome the shortcomings existing in the prior art. In view of this, the present disclosure provides a multi-manifold connector that integrates cold and hot water connectors to effectively save space and avoid resource waste.

The present disclosure adopts the following technical solution. A multi-manifold connector includes a base, a hot water connector, and a cold water connector, where the hot water connector and the cold water connector are arranged on the base; the hot water connector is provided with a water inlet; the cold water connector is provided with a water outlet; a bottom of the base is provided with multiple first water pipes and multiple second water pipes; the multiple first water pipes run through the base and are communicated with the hot water connector; and the multiple second water pipes run through the base and are communicated with the cold water connector.

Further, each of the hot water connector and the cold water connector is provided with a plug; the plug is matched with a circlip; and the circlip is matched with a stopper.

Further, the hot water connector and the cold water connector are L-shaped.

Further, a periphery of the base extends outward to form a support plate.

Further, each of the water inlet and the water outlet is provided with a water pipe joint.

Further, the base, the hot water connector, and the cold water connector are integrally formed.

Further, a sealing structure is provided between the first water pipes and the hot water connector, and a sealing structure is provided between the second water pipes and the cold water connector; and the sealing structure includes two sealing rings and a spacer provided between the two sealing rings.

Further, the bottom of the base is further provided with a cover plate; and the first water pipes and the second water pipes are arranged on the base through the cover plate and matched bolts.

The present disclosure has the following beneficial effects:

The multi-manifold connector includes a base, a hot water connector, and a cold water connector, where the hot water connector and the cold water connector are arranged on the base; the hot water connector is provided with a water inlet; the cold water connector is provided with a water outlet; a bottom of the base is provided with multiple first water pipes and multiple second water pipes; the multiple first water pipes run through the base and are communicated with the hot water connector; and the multiple second water pipes run through the base and are communicated with the cold water connector. A hot water outlet end of a heat pump is connected to the water inlet of the hot water connector. Thus, hot water flows in from the water inlet and flows out from the multiple first water pipes to various areas that require heat up. Cold water generated by heat dissipation flows into the cold water connector from the multiple second water pipes, and finally flows back to a return water storage area of the heat pump from the water outlet of the cold water connector. In this way, the water is circulated. Compared to a traditional method of mounting hot water connector and cold water connector separately, the present disclosure integrates the hot water connector and cold water connector on the base, greatly saving space and avoiding resource waste caused by excessive water pipe connections.

DETAILED DESCRIPTION OF THE EMBODIMENTS

Figure 1:
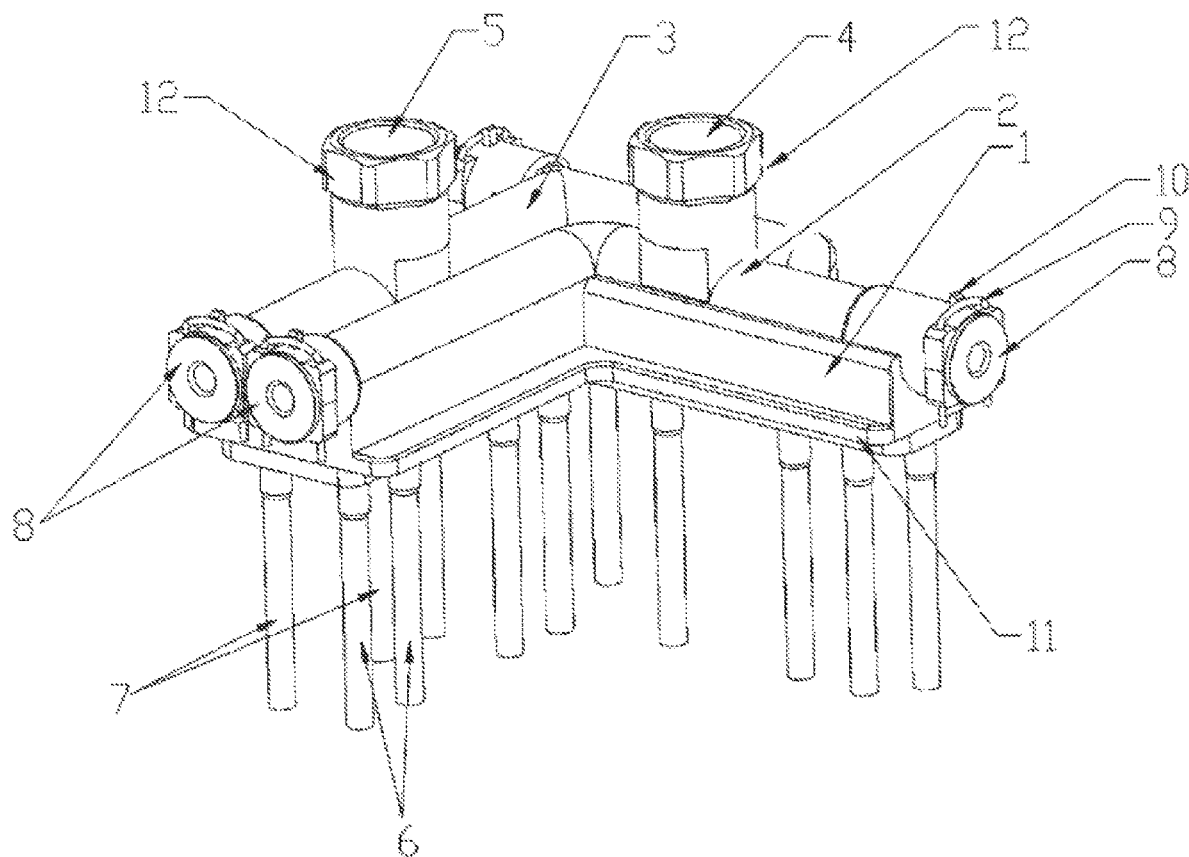
FIG. 1 is a structural diagram of a multi-manifold connector according to the present disclosure.
Figure 2:
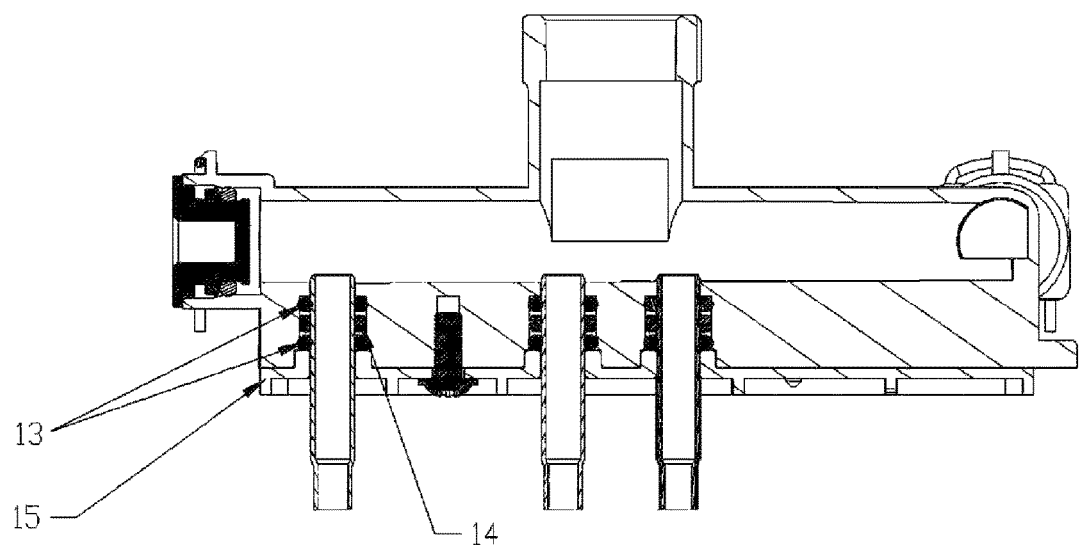
FIG. 2 is a section view of the multi-manifold connector according to the present disclosure.

As shown in FIGS. 1 and 2, an embodiment of the present disclosure provides a multi-manifold connector. The multi-manifold connector includes base 1, hot water connector 2, and cold water connector 3. The hot water connector 2 and the cold water connector 3 are arranged on the base 1. The hot water connector 2 is provided with water inlet 4. The cold water connector 3 is provided with water outlet 5. A bottom of the base 1 is provided with multiple first water pipes 6 and multiple second water pipes 7. The multiple first water pipes 6 run through the base 1 and are communicated with the hot water connector 2. The multiple second water pipes 7 run through the base 1 and are communicated with the cold water connector 3.

In the above solution, hot water flows in from the water inlet 4 of the hot water connector 2 and flows out from the multiple first water pipes 6 to various areas that require heat dissipation. Cold water generated by heat dissipation flows into the cold water connector 3 from the multiple second water pipes 7, and finally flows back to a water storage area from the water outlet 5 of the cold water connector 3. In this way, the water is circulated.

In a preferred solution, as shown in FIG. 1, each of the hot water connector 2 and the cold water connector 3 is provided with plug 8. The plug 8 is matched with circlip 9. The circlip 9 is matched with stopper 10. The hot water connector 2 and the cold water connector 3 are L-shaped. A periphery of the base 1 extends outward to form support plate 11. Each of the water inlet 4 and the water outlet 5 is provided with water pipe joint 12.

In the above solution, the plug 8, the circlip 9, and the stopper 10 have the following effects. The circlip 9 ensures the seal of the plug 8. The stopper 10 is configured to limit the position of the circlip 9 and prevent the circlip 9 from being misaligned, thereby ultimately forming a sealed space inside the hot water connector 2 and the cold water connector 3. The support plate 11 is configured to support the hot water connector 2 and the cold water connector 3.

In the above solution, as shown in FIGS. 1 and 2, the base 1, the hot water connector 2, and the cold water connector 3 are integrally formed. A sealing structure is provided between the first water pipes 6 and the hot water connector 2, and a sealing structure is provided between the second water pipes 7 and the cold water connector 3. The sealing structure includes two sealing rings 13 and a spacer 14 provided between the two sealing rings 13. The bottom of the base 1 is further provided with cover plate 15. The first water pipes 6 and the second water pipes 7 are arranged on the base 1 through the cover plate 15 and matched bolts.

The implementations of the present disclosure are described in detail above in combination with the drawings, but the present disclosure is not limited to the described implementations. For those skilled in the art, various changes, modifications, replacements, and variations made to the implementations without departing from the principle and spirit of the present disclosure still fall within the protection scope of the present disclosure.

What is claimed is:

1. A multi-manifold connector, comprising a base, a hot water connector, and a cold water connector, wherein the hot water connector and the cold water connector are arranged on the base; the hot water connector is provided with a water inlet; the cold water connector is provided with a water outlet; a bottom of the base is provided with a plurality of first water pipes and a plurality of second water pipes; the plurality of first water pipes run through the base and are communicated with the hot water connector; and the plurality of second water pipes run through the base and are communicated with the cold water connector, wherein a first sealing structure is provided between each of the plurality of first water pipes and the hot water connector, and a second sealing structure is provided between each of the plurality of second water pipes and the cold water connector; and each of the first sealing structure and the second sealing structure comprises two sealing rings and a spacer, wherein the spacer is provided between the two sealing rings.

2. The multi-manifold connector according to claim 1, wherein each of the hot water connector and the cold water connector is provided with a plug; the plug is fitted into a circlip; and the circlip is fitted into a stopper.

3. The multi-manifold connector according to claim 1, wherein the hot water connector and the cold water connector are L-shaped.

4. The multi-manifold connector according to claim 1, wherein a periphery of the base extends outward to form a support plate.

5. The multi-manifold connector according to claim 1, wherein each of the water inlet and the water outlet is provided with a water pipe joint.

6. The multi-manifold connector according to claim 1, wherein the base, the hot water connector, and the cold water connector are integrally formed.

7. The multi-manifold connector according to claim 1, wherein the bottom of the base is further provided with a cover plate; and the plurality of first water pipes and the plurality of second water pipes are arranged on the base through the cover plate and bolts.

\* \* \* \* \*